(12) United States Patent
Montagnese et al.

(10) Patent No.: US 6,961,071 B2
(45) Date of Patent: Nov. 1, 2005

(54) METHOD AND SYSTEM FOR INVERSION OF DETAIL-IN-CONTEXT PRESENTATIONS WITH FOLDING

(75) Inventors: Catherine Montagnese, Vancouver (CA); Mark H. A. Tigges, Vancouver (CA)

(73) Assignee: Idelix Software Inc., Vancouver (CA)

( * ) Notice: Subject to any disclaimer, the term of this patent is extended or adjusted under 35 U.S.C. 154(b) by 193 days.

(21) Appl. No.: 10/435,657

(22) Filed: May 12, 2003

(65) Prior Publication Data

US 2003/0231177 A1 Dec. 18, 2003

(30) Foreign Application Priority Data

May 17, 2002 (CA) .............................................. 2386702

(51) Int. Cl.[7] .................................................. G09G 5/00
(52) U.S. Cl. ..................... 345/647; 345/646; 345/660; 345/649; 345/629
(58) Field of Search ................................ 345/629–646, 345/647, 649–671, 648, 650, 661

(56) References Cited

U.S. PATENT DOCUMENTS

| | | |
|---|---|---|
| 4,985,849 A | 1/1991 | Hideaki |
| 5,175,808 A | 12/1992 | Sayre |
| 5,185,667 A | 2/1993 | Zimmermann |
| 5,329,310 A | 7/1994 | Liljegren et al. |
| 6,005,611 A | 12/1999 | Gullichsen et al. |

OTHER PUBLICATIONS

Leung, Y. K., et al., "A Review and taxonomy of distortion-oriented presentation techniques", ACM Transactions on Computer–Human Interaction.

Keahey, T. A., et al., "Techniques For Non–Linear Magnification Transformations", Information Visualization '96, Proceedings IEEE Symposium on, San Francisco, CA.

Carpendale, M.S.T., A Framework For Elastic Presenation Space, Simon Frazer University, Mar. 1999.

*Primary Examiner*—Jeffery Brier
*Assistant Examiner*—Eric Woods
(74) *Attorney, Agent, or Firm*—Joseph Conneely; Ogilvy Renault LLP

(57) ABSTRACT

A method is for inverting a distorted surface presentation into an undistorted surface presentation in a detail-in-context presentation system including the steps of: selecting an input point on the undistorted surface; calculating a vector from the input point to a reference viewpoint; locating a starting point lying above the distorted surface and on the vector; locating a first bracketing point for a first intersection point of the vector and the distorted surface lying above the distorted surface and on the vector; locating a second bracketing point for the first intersection point lying below the distorted surface, and below the first intersection point, but above any subsequent intersection points of the vector and the distorted surface; locating a midpoint between the first and second bracketing points; and, determining if the midpoint is an acceptable approximation for the first intersection point thus being an inversion point corresponding to the input point.

20 Claims, 10 Drawing Sheets

METHOD AND SYSTEM FOR INVERSION OF DETAIL-IN-CONTEXT PRESENTATIONS WITH FOLDING

This application claims priority from Canadian Patent Application No. 2,386,702 filed May 17, 2002, and incorporated herein by reference.

The invention relates to the field of computer graphics processing, and more specifically to the inversion of distortions, including folds, in detail-in-context presentations in detail-in-context presentation systems.

BACKGROUND OF THE INVENTION

Display screen are the primary visual display interface to a computer. One problem with these visual display screens is that they are limited in size, thus presenting a challenge to user interface design, particularly when larger amounts of information is to be displayed. This problem is normally referred to as the "screen real estate problem".

Well-known solutions to this problem include panning, zooming, scrolling or combinations thereof. While these solutions are suitable for a large number of visual display applications, these solutions become less effective where the visual information is spatially related, such as maps, newspapers and such like. In this type of information display, panning, zooming and/or scrolling is not as effective as much of the context of the panned, zoomed or scrolled display is hidden.

A recent solution to this problem is the application of "detail-in-context" presentation techniques. Detail-in-context is the magnification of a particular region of interest (the "focal region") in a data presentation while preserving visibility of the surrounding information. This technique has applicability to the display of large surface area media, such as maps, on limited size computer screens including personal digital assistance (PDA's) and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation where the distortion is the result of the application of a "lens" like distortion function to the original representation. A detailed review of various detail-in-context presentation techniques such as Elastic Presentation Space ("EPS") may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), and incorporated herein by reference.

Development of increasingly powerful computing devices has lead to new possibilities for applications of detail-in-context viewing.

One shortcoming of the prior art detail-in-context presentation methods is their inability to effectively invert distortions in a detail-in-context presentation back to an original or undistorted presentation of the representation. The ability to perform such an inversion or inverse mapping would be of great value in extending the capabilities of detail-in-context presentations to applications such as image editing. For example, the editing of a focal region in a representation may be facilitated more easily in a distorted presentation rather than in an undistorted presentation.

The ability to perform an inverse mapping is also necessary for applications involving the subsequent distortion of a previously distorted presentation. In other words, inversion would allow a presentation system user to accurately position or reposition one or more distortion producing "lenses" within a given presentation that has already been distorted. Hence, the distorted presentation ultimately viewed by the user may be the end result of a series of distortion steps wherein the individual distortion steps are not known or are difficult to invert. In fact, the need for inversion arises whenever it is necessary to position a lens based on observed coordinates in the distorted presentation. This is so because the lens may be directly generated only from coordinate information in the undistorted presentation. As such, an inversion is necessary to produce the source coordinates for generating the lens.

Moreover, inversion provides a means to calculate real distances in an undistorted presentation based on locations within one or more lenses in a corresponding distorted presentation. For example, if a user wants to know the distance in the undistorted presentation between the focal points of two separate lenses in a corresponding distorted presentation of a map, such as the distance between a current location and a destination location, this distance can be computed via inversions of the focal points of these lenses.

Several systems are known which provide techniques for converting distorted or warped three-dimensional (3D) images into corrected, undistorted, or dewarped two-dimensional (2D) images. In U.S. Pat. No. 6,005,611, to Gullichsen, et al., a system is disclosed wherein a distorted image captured by a wide-angle or fisheye lens is corrected through the use of a specially generated polynomial transform function that maps points from the distorted image into rectangular points. A more complex transform function is described in U.S. Pat. No. 5,185,667, to Zimmerman. In U.S. Pat. No. 5,329,310, to Liljegern, et al., a similar objective is achieved in the context of motion picture images through the use of multiple lens (i.e. camera and projector) transfer functions. The result being the ability to project an image, taken from a particular point of view, onto a screen, especially a curved wide angle screen, from a different point of view, to be viewed from the original point of view, without distortion. In U.S. Pat. No. 5,175,808, to Sayre, a method and apparatus for non-affine image warping is disclosed that uses displacement tables to represent the movement of each pixel from an original location in a source image to a new location in a warped destination image. Through these displacement tables and a resampling method, the need for inversion of the underlying transform equation that specify the distortion or warp is eliminated. Finally, in U.S. Pat. No. 4,985,849, to Hideaki, look-up tables are used in combination with the forward evaluation of the transform equation in order to avoid the step of transform equation inversion. However, none of these systems disclose a method and system for inverting distortions in a manner that is optimized for detail-in-context presentations.

In U.S. patent application Ser. No. 09/932,088, assigned to the applicant of the present invention, a method and system for inverting distortions for detail-in-context presentations is disclosed. However, the method disclosed does not adequately invert distortions That include extreme "folding" as described by Carpendale. Folding occurs in a detail-in-context presentation, for example, when the applied distortion causes an undistorted surface of the presentation to be hidden by a portion of the distorted surface when viewed by a user on a computer display screen.

A need therefore exists for the effective inversion of distortions, including folds, in detail-in-context presentations in detail-in-context presentation systems. Consequently, it is an object of the present invention to obviate or mitigate at least some of the above mentioned disadvantages.

SUMMARY OF THE INVENTION

In general, the present invention provides for the effective inversion of distortions, including folds, in detail-in-context presentations in detail-in-context presentation systems.

According to one aspect of the invention, a method is provided for inverting a distorted surface presentation into an undistorted surface presentation in a detail-in-context presentation system. The method includes the steps of: (a) selecting an input point $\vec{p}_{input}$ on the undistorted surface; (b) calculating a vector $\vec{v}$ from the input point $\vec{p}_{input}$ to a reference viewpoint $\vec{vrp}$; (c) locating a starting point $\vec{p}_{i-1}$, the starting point $\vec{p}_{i-1}$ lying above the distorted surface and on the vector $\vec{v}$; (d) locating a first bracketing point $\vec{p}_i$, for a first intersection point of the vector $\vec{v}$ and the distorted surface, the first bracketing point $\vec{p}_i$, lying above the distorted surface and on the vector $\vec{v}$; (e) locating a second bracketing point $\vec{p}_{i-1}$ for the first intersection point, the second bracketing point $\vec{p}_{i+1}$ lying below the distorted surface, and below the first intersection point, but above any subsequent intersection points of the vector $\vec{v}$ and the distorted surface; (f) locating a midpoint $\vec{p}_{mid}$ between the first and second bracketing points $\vec{p}_i$, $\vec{p}_{i+1}$; and, (g) determining if the midpoint $\vec{p}_{mid}$ is an acceptable approximation for the first intersection point; the acceptable approximation being an inversion point corresponding to the input point $\vec{p}_{input}$.

According to another aspect of the invention, the method further includes the step of repeating steps (a) through (g) for remaining input points $\vec{p}_{input}$.

Advantageously, the method may be applied to a distorted point that is acted on by a single lens including a lens having extreme "folding". The present invention facilitates the location of the point in the undistorted data space which, when distorted, yields a specified point in the distorted data space. Then, if desired, the inverse mapping of the entire distorted space to the original undistorted data space can be obtained as the inverse mapping of the locus of the points in the distorted data space.

BRIEF DESCRIPTION OF THE DRAWINGS

Embodiments of the invention may best be understood by referring to the following description and accompanying drawings. In the description and drawings, line numerals refer to like structures or processes. In the drawings.

DETAILED DESCRIPTION OF THE PREFERRED EMBODIMENTS

Figure 1:
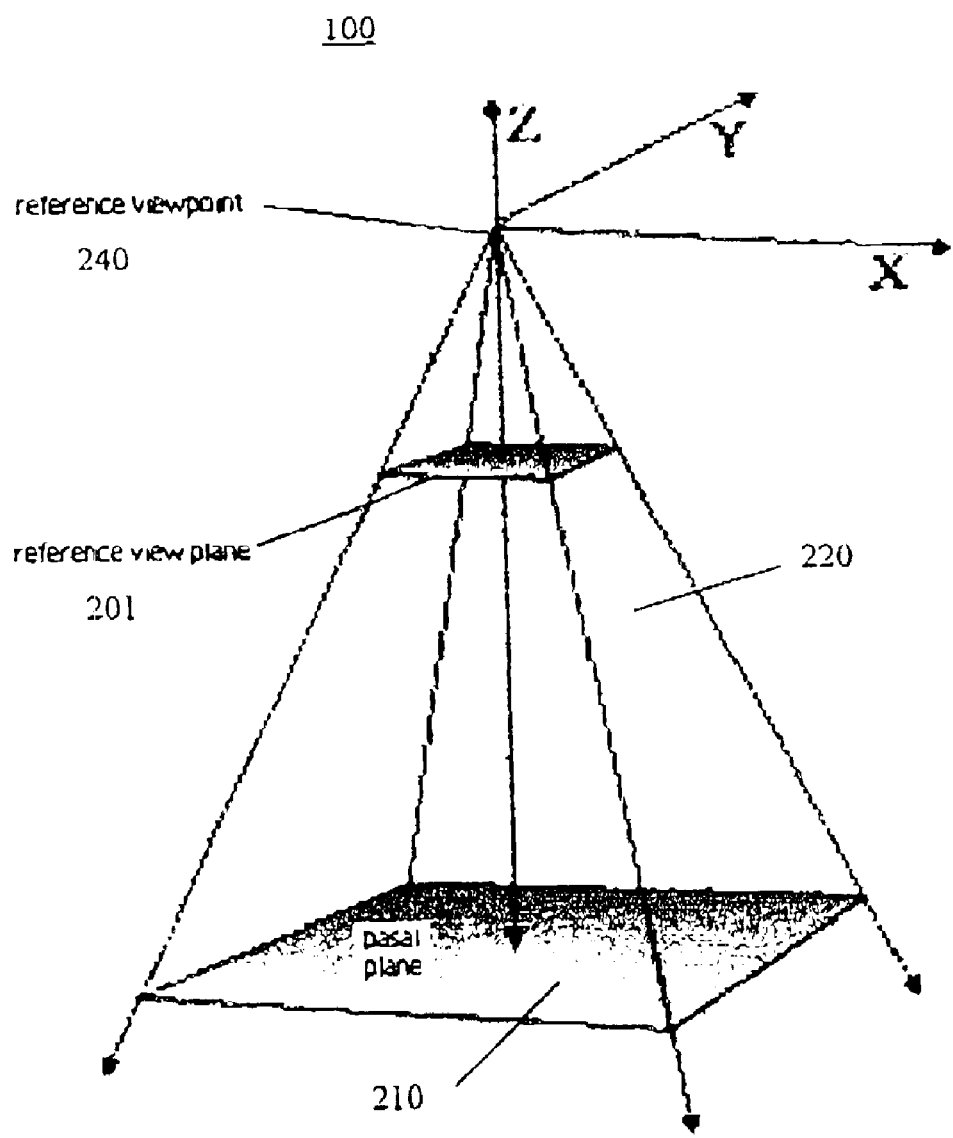
FIG. 1 is a graphical representation of the geometry for constructing a three-dimensional (3D) perspective viewing frustum, relative to an x, y, z coordinate system, in accordance with known elastic presentation space (EPS) graphics technology.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. In the drawings, like numerals refer to like structures or processes.

The term "data processing system", is used herein to refer to any machine for processing data, including the computer systems and network arrangements described herein. The term "Elastic Presentation Space" ("EPS") (or "Pliable Display Technology" ("PDT")) is used herein to refer to techniques that allow for the adjustment of a visual presentation without interfering with the information content of the representation. The adjective "elastic" is included in the term as it implies the capability of stretching and deformation and subsequent return to an original shape. EPS graphics technology is described by Carpendale in "A Framework for Elastic Presentation Space" (Carpendale, Marianne S. T., *A Framework for Elastic Presentation Space* (Burnaby, British Columbia: Simon Fraser University, 1999)) which is incorporated herein by reference. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

Referring to FIG. 1, there is shown a graphical representation 100 of the geometry for constructing a three-dimensional (3D) perspective viewing frustum 220, relative to an x, y, z coordinate system, in accordance with known elastic presentation space (EPS) graphics technology. In the EPS, detail-in-context views of 2D visual representations are created with sight-line aligned distortions of a two-dimensional (2D) information presentation surface within a 3D perspective viewing frustum 220. In EPS, magnification of regions of interest and the accompanying compression of the contextual region to accommodate this change in scale are produced by the movement of regions of the surface towards the viewpoint 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
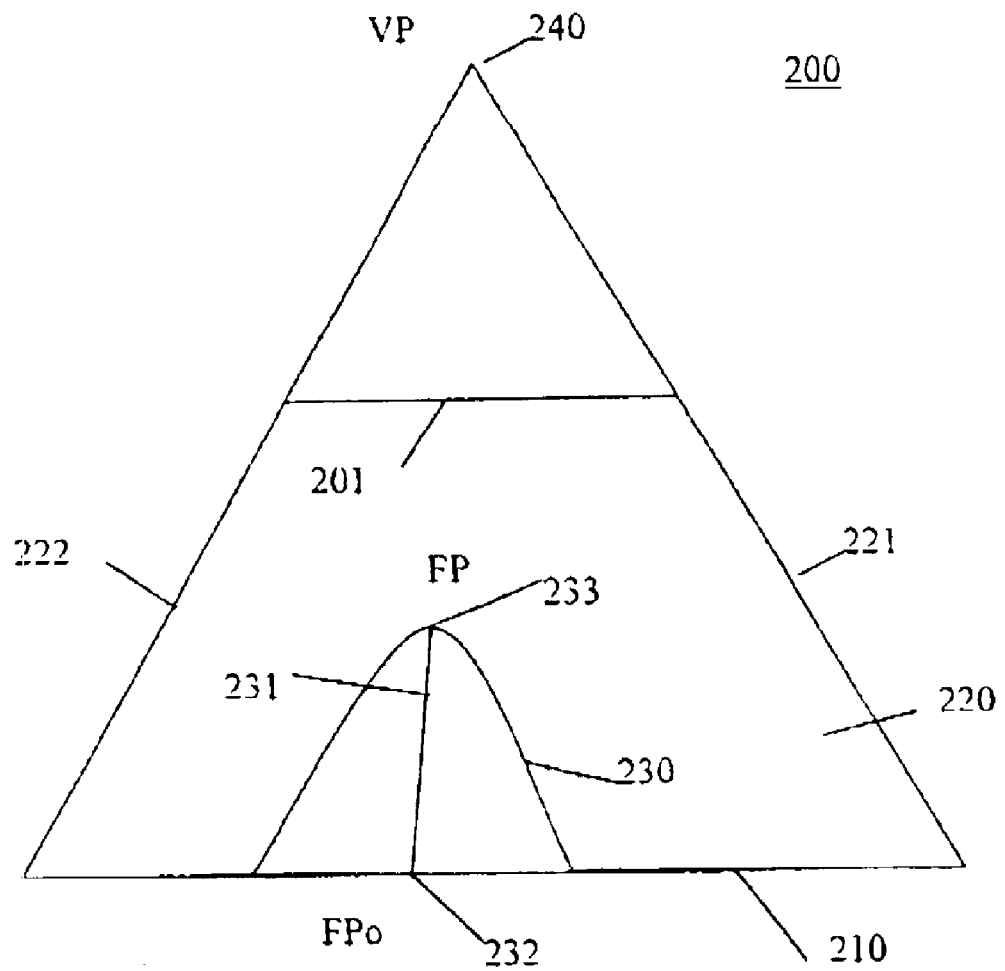
FIG. 2 is a graphical representation of the geometry of a presentation in accordance with known EPS graphics technology.

Referring to FIG. 2, there is shown a graphical representation 200 of the geometry of a presentation in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. A viewpoint ("VP") 240 is located above the centre point of the basal plane 210 and reference view plane 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

To reiterate, EPS refers to a collection of know-how and techniques for performing "detail-in-context viewing" (also known as "multi-scale viewing"and "distortion viewing") of information such as images, maps, and text, using a projection technique summarized below. EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired, in combination with compression of a restricted range of areas of the remaining information (the "context"), the end result typically giving the appearance of a lens having been applied to the display surface. EPS has numerous advantages over conventional zoom, pan, and scroll technologies, including the capability of preserving the visibility of information outside the local region of interest.

In general, in EPS, The source image to be viewed is located in the basal plane. Magnification and compression are achieved through elevating elements of the source image relative to the basal plane, and then projecting the resultant distorted surface onto the reference view plane. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation.

For example, and referring to FIGS. 1 and 2, in two dimensions, EPS can be implemented through the projection of an image onto a reference plane 201 in the following manner. The source image is located on a basal plane 210, and those regions of interest 233 of the image for which magnification is desired are elevated so as to move them closer to a reference plane situated between the reference viewpoint 240 and the reference view plane (RVP) 201. Magnification of the "focal region" 233 closest to the RVP varies inversely with distance from the RVP 201. As shown in FIGS. 1 and 2, compression of regions outside the focal region 233 is a function of both distance from the RVP 201, and the gradient of the function describing the vertical distance from the RVP 201 with respect to horizontal distance from the focal region 233. The resultant combination of magnification and compression of the image as seen from the reference viewpoint 240 results in a lens-like effect similar to that of a magnifying glass applied to the image, and the resultant distorted image may be referred to as a "pliable display surface". Hence, the various functions used to vary the magnification and compression of the image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
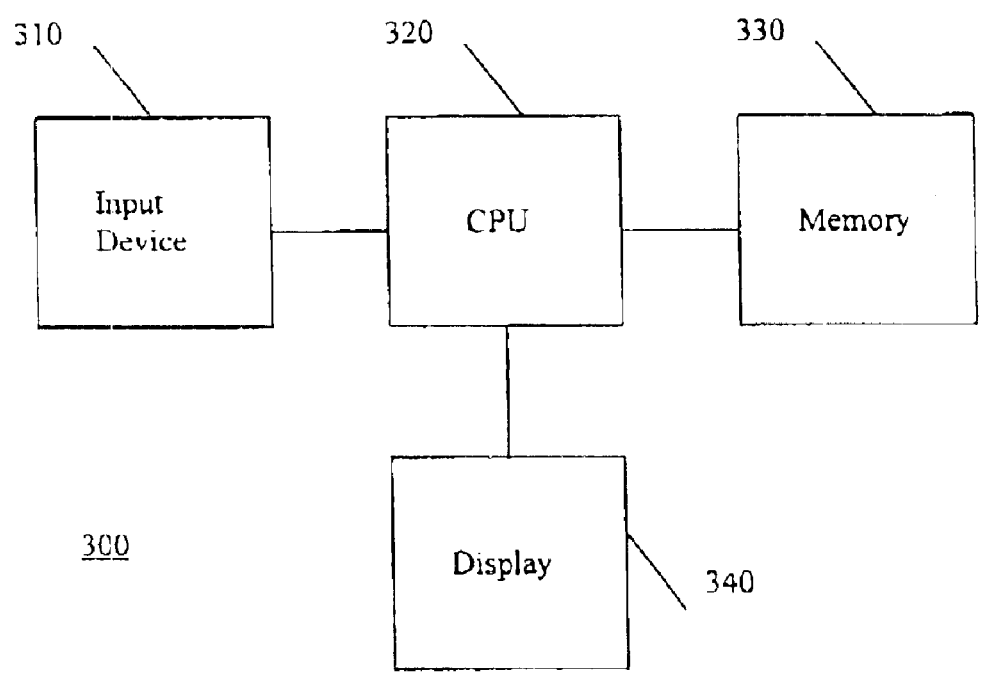
FIG. 3 is a block diagram illustrating an exemplary data processing system for implementing an embodiment of the invention.

System. Referring to FIG. 3, there is shown a block diagram of an exemplary data processing system 300 for implementing an embodiment of the invention. The data processing system is suitable for implementing EPS technology. The data processing system 300 includes an input device 310, a central processing unit or CPU 320, memory 330, and a display 340. The input device 310 may include a keyboard, mouse, trackball, or similar device. The CPU 320 may include dedicated coprocessors and memory devices. The memory 330 may include RAM, ROM, databases, or disk devices. And, the display 340 may include a computer screen or terminal device. The data processing system 300 has stored therein data representing sequences of instructions which when executed cause the method described herein to be performed. Of course, the data processing system 300 may contain additional software and hardware a description of which is not necessary for understanding the invention.

Method. Referring to FIGS. 1 through 9, a method for finding the inverse of a detail-in-context distortion 230 of a data presentation according to one embodiment of the invention will now be described. The presentation can be generated, using, for example, a perspective projection technique such as that described by Carpendale in which viewer-aligned perspective projections are used to produce detail-in-context presentations in a reference view plane 201 which may be viewed on a display 340. In the process of producing the presentation, the undistorted two-dimensional data is located in the basal plane 210 of a three-dimensional perspective viewing volume 220. Using PDT, points in the basal plane 110 are displaced upward onto a distorted surface 230 which is based on a three-dimensional distortion function ("D"). In the following, the term "undisplacement" (or "undisplace") will refer to the application of the inverse distortion to a particular point in distorted space. In general, the PDT distortion of a point is not analytically invertible. The method of the present invention includes procedures to undisplace a point that has been distorted by a PDT lens. Advantageously, the method may be applied to a distorted point that is acted on by a single lens including a lens having extreme "folding" as defined by Carpendale. The present invention facilitates the location of the point in the undistorted data space which, when distorted, yields a specified point in the distorted data space. Then, if desired, the inverse mapping of the entire distorted space to the original undistorted data space can be obtained as the inverse mapping of the locus of the points in the distorted data space.

Figure 4:
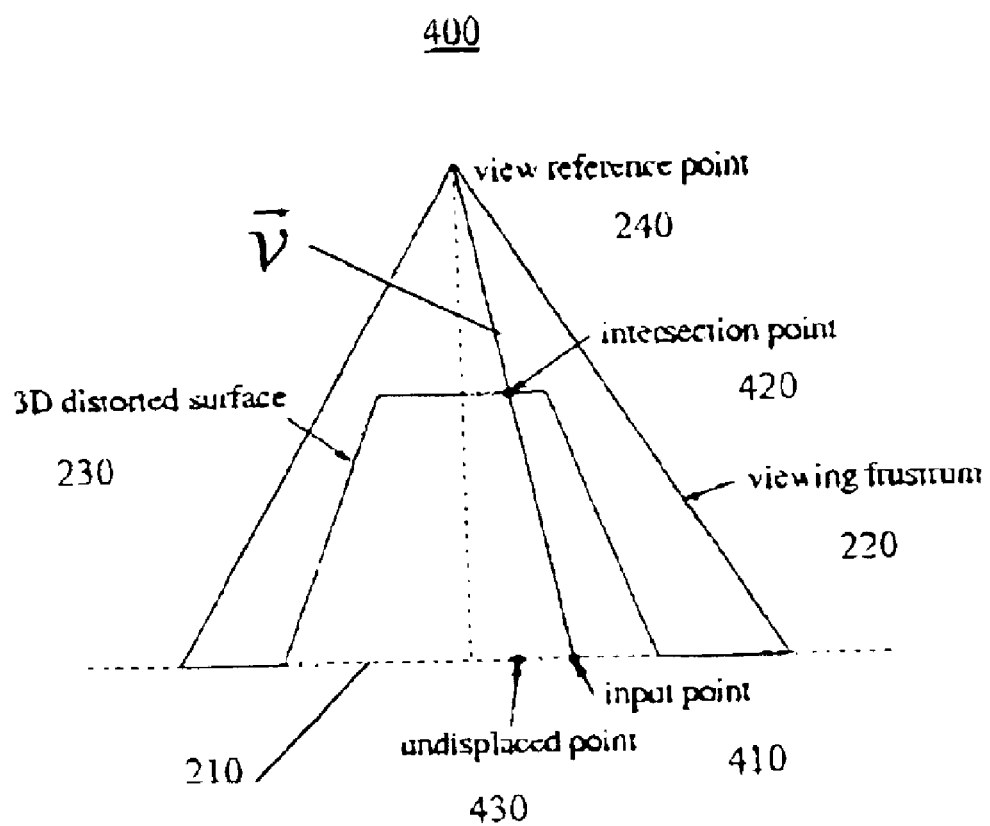
FIG. 4 is a graphical representation of the geometry of a presentation illustrating the intersection points of a vector $\vec{v}$ drawn from the view reference point through the distorted surface in accordance with an embodiment of the invention.

Referring to FIG. 4, there is shown a graphical representation 400 of the geometry of a presentation illustrating the intersection points of a vector $\vec{v}$ drawn frame the view reference point 240 through the distorted surface 230 in accordance with an embodiment of the invention. Given the vector $\vec{v}$ from the view reference point 240 of the viewing frustrum 220 to the input point 410 requiring undisplacement, an intersection point 420 must first be found where the vector $\vec{v}$ intersects the three-dimensional PDT distorted surface 230. The intersection point 420 corresponds to the three-dimensional displacement of the undisplaced point 430 in the basal plane 210, the undisplaced point 430 being the point that the method will determine.

Figure 5:
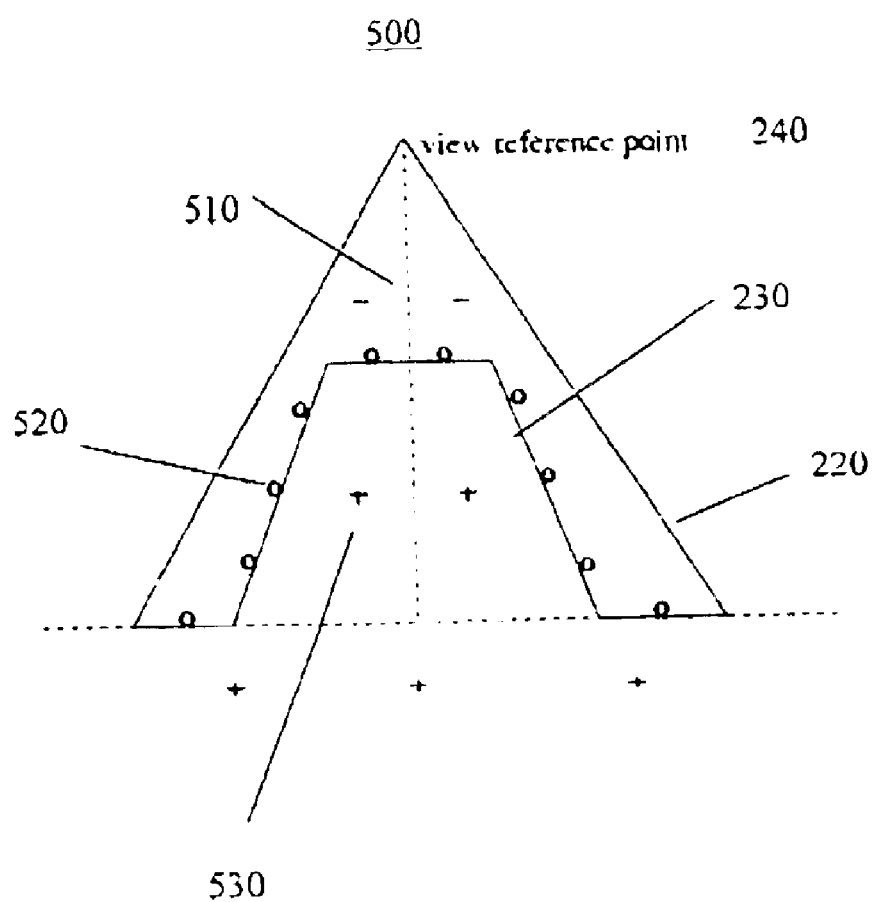
FIG. 5 is shown a graphical representation of the geometry of a presentation illustrating points outside, points on, and points inside a distorted surface, in accordance with an embodiment of the invention.
Figure 6:
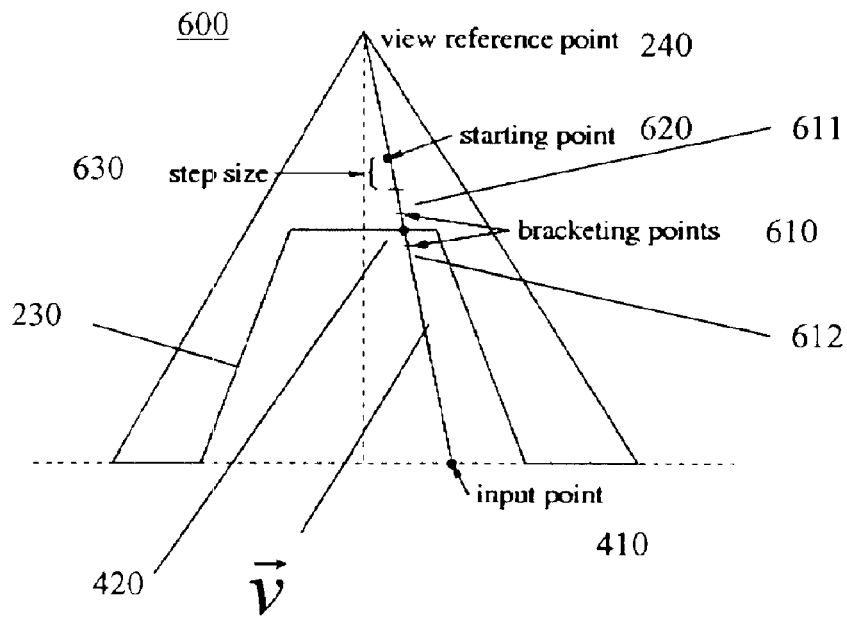
FIG. 6(a) is a graphical representation of the geometry of a presentation illustrating the process of stepping towards the intersection point for a distorted surface without extreme folding, in accordance with an embodiment of the invention.
FIG. 6(b) is a graphical representation of the geometry of a presentation illustrating the process of stepping towards the intersection point for a distorted surface with extreme folding, in accordance with an embodiment of the invention.
Figure 6:
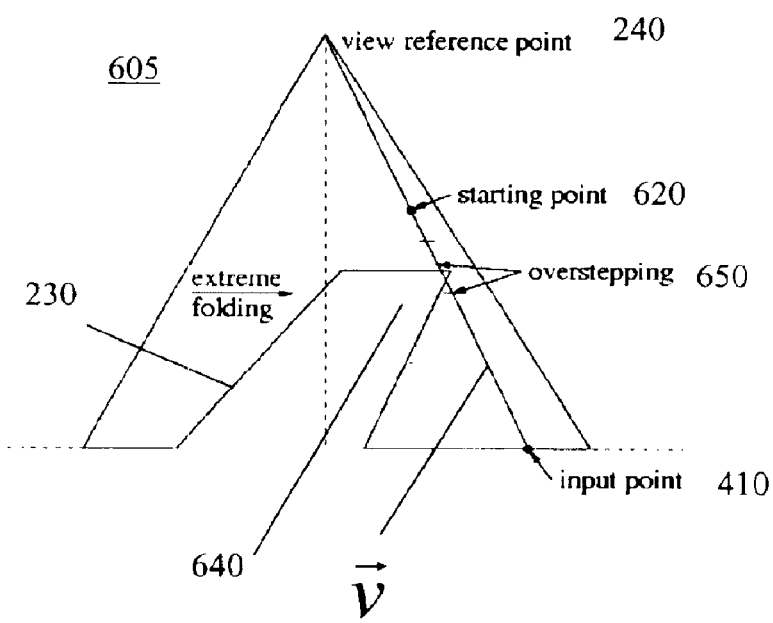

Referring to FIG. 5, there is shown a graphical representation 500 of the geometry of a presentation illustrating points outside 510 ("−"), points on 520 ("0"), and points inside 530 ("+") a distorted surface 230, in accordance with an embodiment of the invention. The method employs a "field function" that specifies whether a point falls above 510, on 520, or below 530 the distorted surface 230. If the point falls on 520 the surface 230, then the field function returns a value of zero. A negative value is returned if the point falls above 510 the surface 230 and a positive value is returned if the point falls below 530 the surface 230. Given the vector $\vec{v}$ from the input point 410 to the view reference point 240, two points on $\vec{v}$ can be found such that the field function returns opposite signs for each point. These points "bracket" the point of intersection 420. The point of intersection 420 can then be found with a "bisection search" where the bracketing points are used to locate the intersection.

Referring to FIG. 6(a), there is shown a graphical representation 600 of the geometry of a presentation illustrating the process of stepping towards the intersection point 420 for a distorted surface 230 without extreme folding, in accordance with an embodiment of the invention. Two bracketing points 610, including an upper bracketing point 611 and a lower bracketing point 612, are found which can then be used in a bisection process to find the intersecting point 420. Referring to FIG. 6(b), there is shown a graphical representation 605 of the geometry of a presentation illustrating the process of stepping towards the intersection point 420 for a distorted surface 230 with extreme folding, in accordance with an embodiment of the invention. Extreme folding occurs in a detail-in-context presentation, for example, when the applied distortion 230 causes an undistorted surface 210 of the presentation to be hidden by a portion of the distorted surface 640 when viewed by a user on a computer display screen 340. If a lens has undergone extreme folding, then the lower bracketing point 612 may be missed in the stepping process. If this occurs, then step refinement is used to decrease the magnitude of the step size 630.

Beginning at a starting point 620 on $\vec{v}$ that lies above 510 the distorted surface 230, an initial step size 630 is used to step along $\vec{v}$ towards the distorted surface 230. The field function is evaluated at each point along $\vec{v}$ and the sign of the result is compared with the sign of the field function evaluation for the previous point. If the comparison yields opposite signs, then two points 610 have been obtained that bracket the intersecting point 420. If the comparison yields the same signs, then one of two instances will have occurred. In the first instance, a point has been obtained that is still above 510 the surface 230 and the stepping process may continue. In the second instance, a point has been obtained that falls below a folded cusp 640 of the distorted surface 230 that may result due to extreme folding. This phenomenon will be referred to as "overstepping" 650. Overstepping 650 occurs if the step size 630 is too large resulting in the lower bracketing point 612 being missed (i.e. overstepped) in the stepping process. If this occurs, then the step size 630 is reduced to avoid missing the lower bracketing point 612. Once the bracketing points 610 have been obtained, then a bisection search is used to locate the intersecting point. This search will be described in more detail below.

Figure 7:
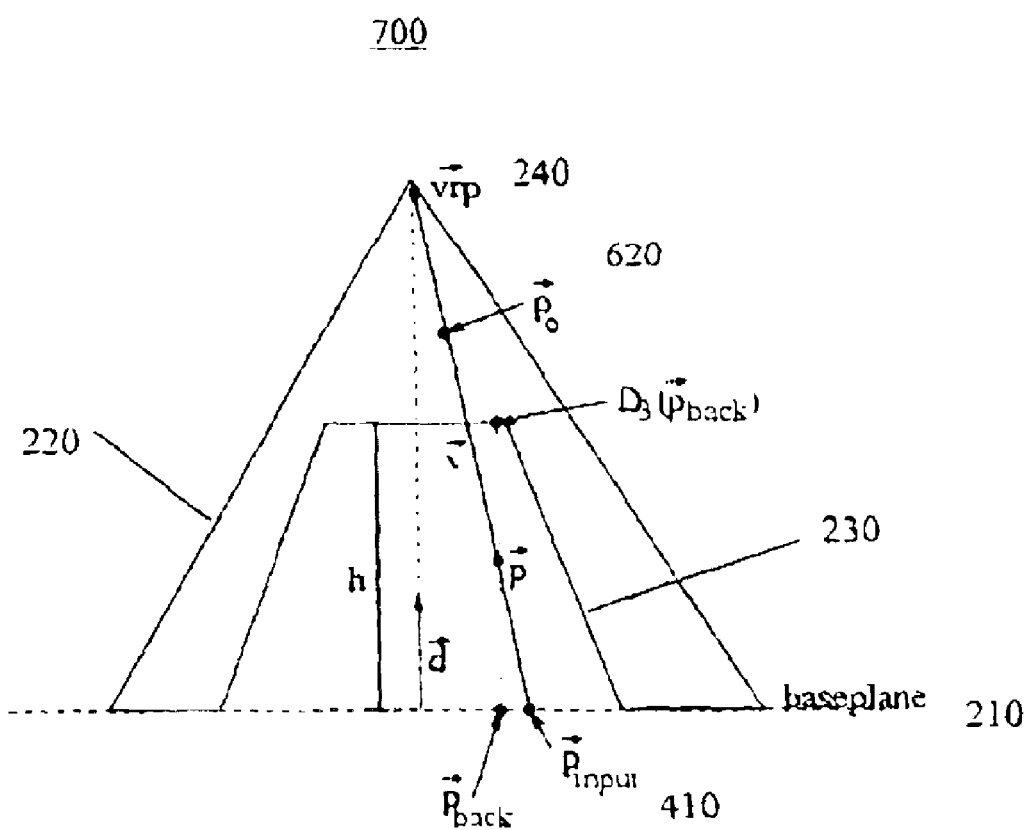
FIG. 7 is a graphical representation of the geometry of a presentation illustrating defined parameters in accordance with an embodiment of the invention.
Figure 8:
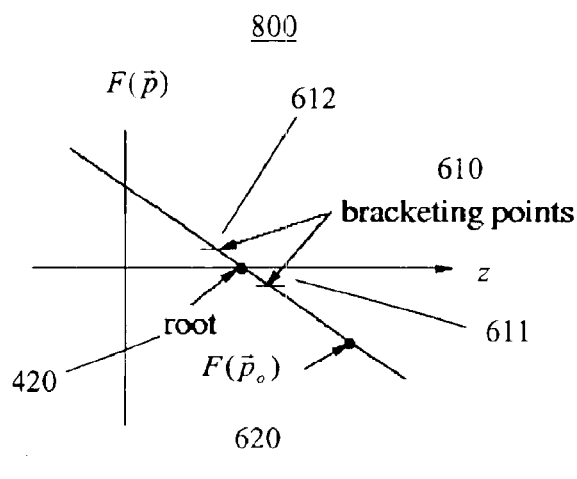
FIG. 8(a) is a graph illustrating the field function $F(\vec{p})$ along the domain of $\vec{v}$ for the lens of FIG. 6(a), in accordance with an embodiment of the invention.
FIG. 8(b) is a graph illustrating the field function $F(\vec{p})$ along the domain of $\vec{v}$ for the lens of FIG. 6(b), in accordance with an embodiment of the invention; and, FIG. 9 is a graph illustrating the field function $F(\vec{p})$ along the domain of $\vec{v}$ for the lens of FIG. 6(b) in the event of overstepping, in accordance with an embodiment of the invention; and, FIG. 10 is a flow chart illustrating a general method for inversion in accordance with an embodiment of the invention.
Figure 8:
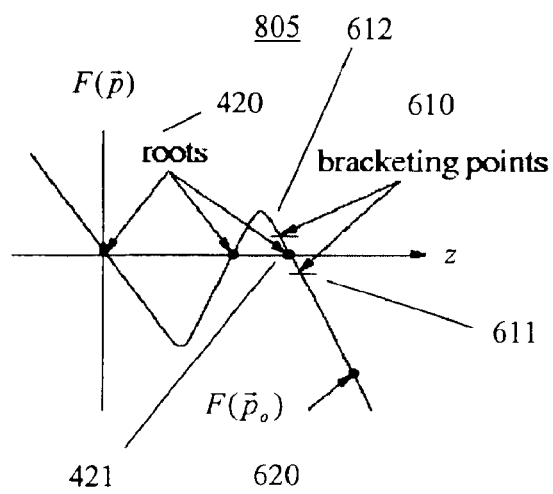

Referring to FIG. 7, there is shown a graphical representation 700 of the geometry of a presentation illustrating defined parameters in accordance with an embodiment of the invention. The illustrated parameters will be used in the following mathematical description of the method. Let $\vec{p}_{input}$ 410 be the point to be undisplaced and let v $\vec{r}$ p be the view reference point 240 of the viewing frustrum 220. Define $\vec{v}$ as the vector from $\vec{p}_{input}$ to v $\vec{r}$ p and let $\vec{p}$ be any point on $\vec{v}$. If $\vec{d}$ is the direction of displacement of the three-dimensional PDT distortion 230, then let $\vec{p}_{back}$ be the back-projection of $\vec{p}$ along $\vec{d}$ onto the baseplane 210. Let the three-dimensional PDT distortion of $\vec{p}_{back}$ be defined by $D_3(\vec{p}_{back})$. The field function that is used to specify whether a point falls below, above, or on a PDT distorted surface 230 is defined as $F(\vec{p}) = D_3(\vec{p}_{back})_z - \vec{p}_z$, which returns a scalar value. The field function compares the z components of the point of interest and the corresponding PDT distorted value of the back-projected point. The field function $F(\vec{p})$ along the domain of $\vec{v}$ may be plotted.

Referring to FIG. 8(a), there is shown a graph 800 illustrating the field function $F(\vec{p})$ along the domain of $\vec{v}$ for the lens 230 of FIG. 6(a), in accordance with an embodiment of the invention.

Referring to FIG. 8(b), there is shown a graph 805 illustrating the field function $F(\vec{p})$ along the domain of $\vec{v}$ for the lens 230 of FIG. 6(b), in accordance with an embodiment of the invention. The graph shown in FIG. 8(a) has one root 420 that corresponds to the single intersection of $\vec{v}$ with the surface 230 illustrated in FIG. 6(a). The graph shown in FIG. 8(b) has three roots 420 since $\vec{v}$ intersects the surface 230 in FIG. 6(b) three times.

To converge on the correct root 420, it is essential that a good starting point 620 for initiating the stepping process be chosen. Since it is desired to converge on the root 420 that has the largest z value (i.e. the bracketed root 421 in FIG. 8(b)), a starting point $\vec{p}_0$ that has a larger z value than this root 420 is chosen. Referring to FIG. 7, this corresponds to a starting value $\vec{p}_0$ on $\vec{v}$ that is above the PDT surface 230. Mathematically, $\vec{p}_0$ may be described by $$\vec{p}_0 = \vec{p}_{input} + \left(\frac{h}{v_z} + step\right)\vec{v},$$

where h is the height of the lens 230 and step is a predetermined initial step size 630.

The stepping process is initiated with $\vec{p}_0$. In general, given a point $\vec{p}_i$ on $\vec{v}$, the next point on $\vec{v}$ is $\vec{p}_{i+1} = \vec{p}_i + step \cdot \vec{v}$. The field function $F(\vec{p})$ is evaluated at $\vec{p}_{i+1}$ and $\vec{p}_{i+1}$. If the evaluations yield the same signs for $\vec{p}_i$ and $\vec{p}_{i+1}$, then one of two instances will have occured. In the first instance, a point has been obtained that is still above 510 the distorted surface 230 and the stepping process may continue. In the second instance, a point has been obtained that falls below the cusp 640 of a folded lens 230 resulting in overstepping 650. The field function results at $\vec{p}_i$ and $\vec{p}_{i+1}$ (i.e. $F(\vec{p}_i)$ and $F(\vec{p}_{i+1})$, respectively) and the slopes at $\vec{p}_i$ and $\vec{p}_{i+1}$ (i.e. $F'(\vec{p}_i)$ and $F'(\vec{p}_{i+1})$, respectively) can be used to determine whether the first or second instance has occurred. If the sign of $F'(\vec{p}_i)$ is equal to the sign of $F'(\vec{p}_{i+1})$ and, at the same time, the sign of $F(\vec{p}_i)$ is equal to the sign of $F(\vec{p}_{i+1})$, then the first instance has occurred and both points are still above the surface. If the sign of $F'(\vec{p}_i)$ is not equal to the sign of $F'(\vec{p}_{i+1})$ and, at the same time, the sign of $F(\vec{p}_{i+1})$ is equal to the sign of $F(\vec{p}_{i+1})$, then overstepping has occurred. If overstepping occurs then the step size 630 must be refined (i.e. decreased in magnitude) until these overstepping conditions evaluate to false. Referring to FIG. 8(b), when these conditions evaluate to false, then two points 611, 612 have been found that bracket the intersection point 420. Once two points 611, 612 have been found that bracket the intersection point 420 (i.e. when the field function evaluations at $\vec{p}_i$ and $\vec{p}_{i+1}$ return opposite signs), then a bisection search can be used to calculate the intersection point 420.

Figure 9:
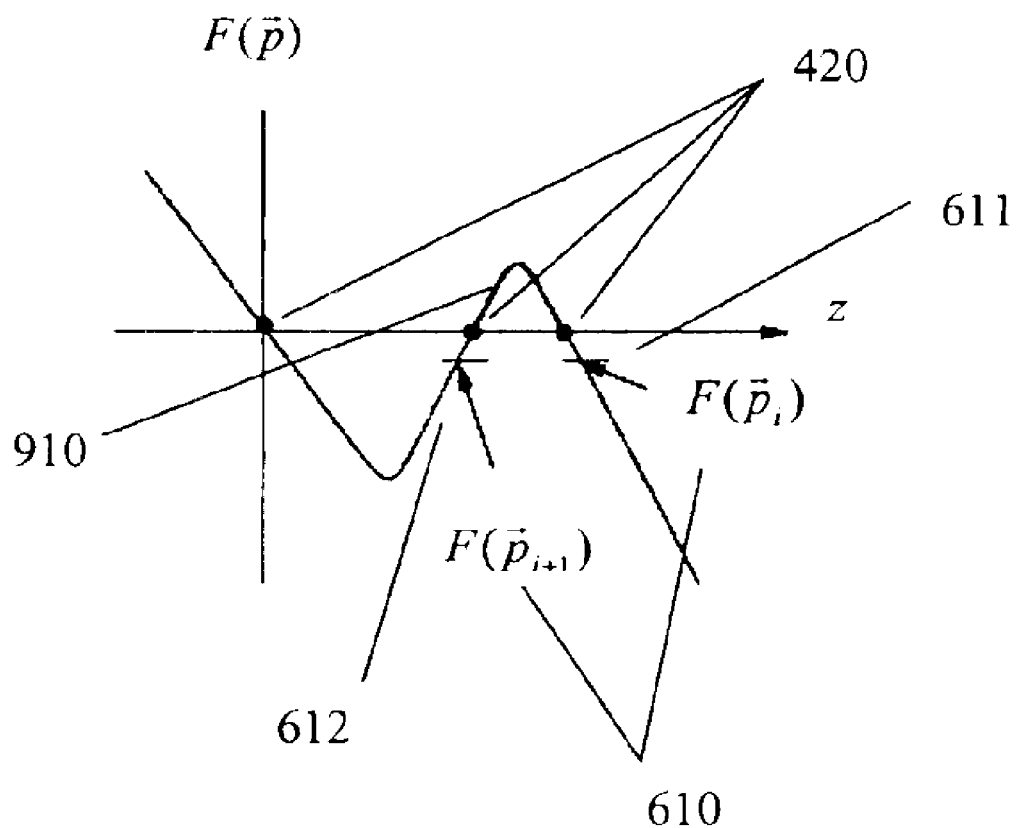

Referring to FIG. 9, there is shown a graph 900 illustrating the field function $F(\vec{p})$ along the domain of $\vec{v}$ for the lens 230 of FIG. 6(b) in the event of overstepping, in accordance with an embodiment of the invention. Note that the slopes at the two points $\vec{p}_i$ and $\vec{p}_{i+1}$ have opposite signs, but that the field function evaluations for these points yield the same signs. These conditions indicate that overstepping has occurred. The point $\vec{p}_{i+1}$ has to fall in the bold region 910 of the graph to be valid (i.e. above the z-axis between roots 420).

Referring to FIGS. 6 through 9, the bisection search method may be described as follows. First, compute the midpoint $$\vec{p}_{mid} = \frac{1}{2}(\vec{p}_i + \vec{p}_{i+1})$$

and back-project this midpoint $\vec{p}_{mid}$ along $\vec{d}$ onto the baseplane 210 to get a point $\vec{p}_{midback}$. Let $D_2(\vec{p}_{midback})$ denote the two-dimensional PDT distortion of $\vec{p}_{midback}$. The point $\vec{p}_{mid}$ is a good approximation to the intersection point 420 if $\|D_2(\vec{p}_{midback}) - \vec{p}_{input}\| < \epsilon$, where $\epsilon$ is small. If this condition is false, then the bisection search continues with either $\vec{p}_i$ and $\vec{p}_{mid}$ or with $\vec{p}_{i+1}$ and $\vec{p}_{mid}$ until the condition is met. When a good approximation of the intersection point 420 is found, then the corresponding back-projection of this approximation is returned as the undisplaced result for $\vec{p}_{input}$ 410.

Figure 10:
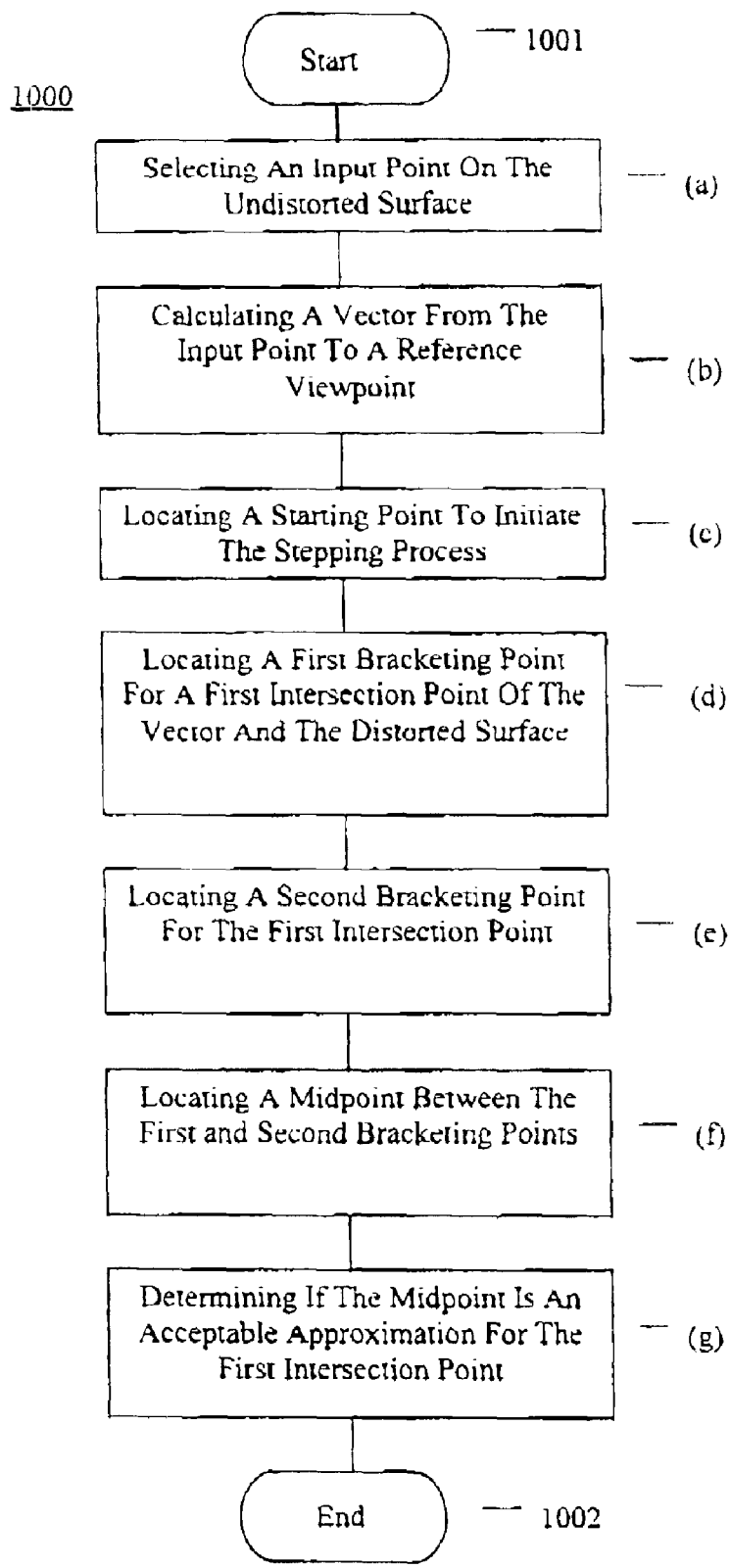

Referring to FIG. 10, there is shown a flow chart 1000 illustrating a general method for inversion in accordance with an embodiment of the invention. In general the method is for inverting a distorted surface presentation into an undistorted surface presentation in a detail-in-context presentation system; the presentation system establishing a notional three-dimensional perspective viewing frustrum with respect to an x, y, and z-axis coordinate system; the frustrum including a reference viewpoint $\vec{vrp}$ at an apex lying on the z-axis, a base in an xy-plane including the undistorted surface, and a reference view plane lying between the reference viewpoint $\vec{vrp}$ and the undistorted surface and upon which the distorted surface is projected; the presentation system including a display screen for viewing the reference view plane by a user; the distorted surface created by the application of a three-dimensional distortion function $D_3$ to the undistorted surface; the distorted surface having a direction of displacement $\vec{d}$; the distorted surface having a height h above the undistorted surface. The method includes several steps as follows.

At step 1001, the method starts.

At step (a), an input point $\vec{p}_{input}$ on the undistorted surface is selected.

At step (b), a vector $\vec{v}$ from the input point $\vec{p}_{input}$ to the reference viewpoint $\vec{vrp}$ is calculated.

At step (c), a starting point $\vec{p}_0$ 620 is located by adding to the input point $\vec{p}_{input}$ the vector $\vec{v}$ scaled by a predetermined step value step added to a ratio of the height h and a z-axis component of the vector $\vec{v}$ that is, $\vec{p}_0 = \vec{p}_{input} + (h/v_z + step)\vec{v}$. The starting point $\vec{p}_0$ lies above the distorted surface and on the vector $\vec{v}$. The starting point may be designated $\vec{p}_{i-1}$.

At step (d), a first bracketing point $\vec{p}_i$ 611 for a first intersection point of the vector $\vec{v}$ and the distorted surface is located by subtracting from the starting point $\vec{p}_{i-1}$ the vector $\vec{v}$ scaled by a predetermined step value step, that is, $\vec{p}_i = \vec{p}_{i-1} - \text{step} \cdot \vec{v}$. The first bracketing point $\vec{p}_i$ lies above the distorted surface and on the vector $\vec{v}$. Note that this step is optional in that the first bracketing point $\vec{p}_i$ may be set equal to the starting point $\vec{p}_{i-1}$.

At step (e), a second bracketing point $\vec{p}_{i+1}$ 612 for the first intersection point is located by subtracting from the first bracketing point $\vec{p}_i$ the vector $\vec{v}$ scaled by a predetermined step value step, that is, $\vec{p}_{i+1} = \vec{p}_i - \text{step} \cdot \vec{v}$. The second bracketing point $\vec{p}_{i+1}$ lies below the distorted surface, and below the first intersection point, but above any subsequent intersection points of the vector $\vec{v}$ and the distorted surface. In other words, the first bracketing point $\vec{p}_i$ and the second bracketing point $\vec{p}_{i+1}$ are located to bracket the first intersection point 421. In general, the first and second bracketing points are located by iteration.

To determine if the first and second bracketing points do bracket the first intersection point, the following steps are performed;

locating a first back-projection point $\vec{p}_{back}(i)$ by projecting the first bracketing point $\vec{p}_i$ parallel to the direction of displacement $\vec{d}$ onto the undistorted surface;

locating a second back-projection point $\vec{p}_{back}(i+1)$ by projecting the second bracketing point $\vec{p}_{i+1}$ parallel to the direction of displacement $\vec{d}$ onto the undistorted surface;

determining a first field function value sign $\text{SIGN}(F(\vec{p}_i))$ for the first bracketing point $\vec{p}_i$ by:

taking the sign of a first field function value $F(\vec{p}_i)$; the first field function value $F(\vec{p}_i)$ determined by:
calculating a first three-dimensional distortion function point for the first back-projection point $D_3(\vec{p}_{back}(i))$ by applying the three-dimensional distortion function $D_3$ to the first back-projection point $\vec{p}_{back}(i)$ and subtracting from a z-axis component of the first three-dimensional distortion function point $D_3(\vec{p}_{back}(i))$ a z-axis component of the first bracketing point $\vec{p}_i$, that is, $F(\vec{p}_i) = D_3(\vec{p}_{back}(i))_z - (\vec{p}_i)_z$;

determining a second field function value sign $\text{SIGN}(F(\vec{p}_{i+1}))$ for the second bracketing point $\vec{p}_{i+1}$ by:
taking the sign of a second field function value $F(\vec{p}_{i+1})$; the second field function value $F(\vec{p}_{i+1})$ determined by:
calculating a second three-dimensional distortion function point for the second back-projection point $D_3(\vec{p}_{back}(i+1))$ by applying the three-dimensional distortion function $D_3$ to the second back-projection point $\vec{p}_{back}(i+1)$ and subtracting from a z-axis component of the second three-dimensional distortion function point $D_3(\vec{p}_{back}(i+1))$ a z-axis component of the second bracketing point $\vec{p}_{i+1}$, that is, $F(\vec{p}_{i+1}) = D_3(\vec{p}_{back}(i+1))_z - (\vec{p}_{i+1})_z$; and, determining if the first bracketing point $\vec{p}_i$ and the second bracketing $\vec{p}_{i+1}$ point bracket the first intersection point. The first bracketing point and the second bracketing point bracket the first intersection point if the first field function value sign $\text{SIGN}(F(\vec{p}_i))$ is not equal to the second field function value sign $\text{SIGN}(F(\vec{p}_{i+1}))$, that is, $\text{SIGN}(F(\vec{p}_i)) \neq \text{SIGN}(F(\vec{p}_{i+1}))$.

If the first bracketing point $\vec{p}_i$ and the second bracketing point $\vec{p}_{i+1}$ do not bracket the first intersection point, that is, $\text{SIGN}(F(\vec{p}_i)) = \text{SIGN}(F(\vec{p}_{i+1}))$, then either the second bracketing point $\vec{p}_{i+1}$ lies above the distorted surface or the second bracketing point $\vec{p}_{i+1}$ has overstepped the distorted surface. In the first case, new first and second bracketing points are located by redefining the second bracketing point $\vec{p}_{i+1}$ as the first bracketing point $\vec{p}_i$ and repeating step (e). In the second case, a new second bracketing point $\vec{p}_{i+1}$ is located by reducing the predetermined step value step by a predetermined amount and repeating step (e).

To determine if the second bracketing point $\vec{p}_{i+1}$ lies above the distorted surface, the following steps are performed:

determining a first field function slope value sign $\text{SIGN}(F'(\vec{p}_i))$ for the first bracketing point $\vec{p}_i$;

determining a second field function slope value sign $\text{SIGN}(F'(\vec{p}_{i+1}))$ for the second bracketing point $\vec{p}_{i+1}$; and, determining if the second bracketing point $\vec{p}_{i+1}$ lies above the distorted surface. The second bracketing point lies above the distorted surface if $\text{SIGN}(F(\vec{p}_i)) = \text{SIGN}(F(\vec{p}_{i+1}))$ and $\text{SIGN}(F'(\vec{p}_i)) = \text{SIGN}(F'(\vec{p}_{i+1}))$.

To determine if the second bracketing point $\vec{p}_{i+1}$ has overstepped the distorted surface, the following steps are performed:

determining a first field function slope value sign $\text{SIGN}(F'(\vec{p}_i))$ for the first bracketing point $\vec{p}_i$;

determining a second field function slope value sign $\text{SIGN}(F'(\vec{p}_{i+1}))$ for the second bracketing point $\vec{p}_i$; and, determining if the second bracketing point $\vec{p}_{i+1}$ has overstepped the distorted surface. The second bracketing point has overstepped the distorted surface if $\text{SIGN}(F(\vec{p}_i)) = \text{SIGN}(F(\vec{p}_{i+1}))$ and $\text{SIGN}(F'(\vec{p}_i)) \neq \text{SIGN}(F'(\vec{p}_{i+1}))$.

At step (f), a midpoint $\vec{p}_{mid}$ between the first and second bracketing points $\vec{p}_i$, $\vec{p}_{i+1}$ located by adding the first and second bracketing points $\vec{p}_i$, $\vec{p}_{i+1}$ and dividing by two, that is, $$\vec{p}_{mid} = \frac{1}{2}(\vec{p}_i + \vec{p}_{i+1}).$$

At step (g), a determination if the midpoint $\vec{p}_{mid}$ is an acceptable approximation for the first intersection point is made by:

locating a midpoint back-projection point $\vec{p}_{midback}$ by projecting the midpoint $\vec{p}_{mid}$ parallel to the direction of displacement $\vec{d}$ onto the undistorted surface;

calculating a two-dimensional distortion function point for the midpoint back-projection point $D_2(\vec{p}_{midback})$ by applying a two-dimensional distortion function $D_2$ to the midpoint back-projection point $\vec{p}_{midback}$; the two-dimensional distortion function $D_2$ being the three-dimensional distortion function $D_3$ in the xy plane;

calculating a magnitude of the difference between the two-dimensional distortion function point $D_2(\vec{p}_{midback})$ and the input point $\vec{p}_{input}$, that is, $\|D_2(\vec{p}_{midback}) - \vec{p}_{input}\|$; and, comparing the magnitude of the difference $\|D_2(\vec{p}_{midback}) - \vec{p}_{input}\|$ to a predetermined tolerance $\epsilon$; the midpoint $\vec{p}_{mid}$ being the acceptable approximation for the first intersection point if the magnitude of the difference is less than the predetermined tolerance $\epsilon$, that is, $\|D_2(\vec{p}_{midback}) - \vec{p}_{input}\| < \epsilon$; and, if the magnitude of the difference $\|D_2(\vec{p}_{midback}) - \vec{p}_{input}\|$ is not less than the predetermined tolerance $\epsilon$, than redefining one of the first and second bracketing points $\vec{p}_i$, $\vec{p}_{i+1}$ as the midpoint $\vec{p}_{mid}$ and repeating steps (f) and (g) until the acceptable approximation is located for the first intersection point; the acceptable approximation being an inversion point corresponding to the input point $\vec{p}_{input}$.

At step 1002, the method ends.

Finally, steps (a) through (g) may be repeated for remaining input points $\vec{p}_{input}$.

Data Carrier Product. The sequences of instructions which when executed cause the method described herein to be performed by the exemplary data processing system of FIG. 3 can be contained in a data carrier product according to one embodiment of the invention. This data carrier product can be loaded into and run by the exemplary data processing system of FIG. 3.

Computer Software Product. The sequences of instructions which when executed cause the method described herein to be performed by the exemplary data processing system of FIG. 3 can be contained in a computer software product according to one embodiment of the invention. This computer software product can be loaded into and run by the exemplary data processing system of FIG. 3.

Integrated Circuit Product. The sequences of instructions which when executed cause the method described herein to be performed by the exemplary data processing system of FIG. 3 can be contained in an integrated circuit product including a coprocessors or memory according to one embodiment of the invention. This integrated circuit product can be installed in the exemplary data processing system of FIG. 3.

Although preferred embodiments of the invention have been described herein, it will be understood by those skilled in the art that variations may be made thereto without departing from the spirit of the invention or the scope of the appended claims.

The embodiments of the invention in which exclusive property of privilege is claimed are defined as follows:

1. A method for inverting a distorted surface presentation into an undistorted surface presentation in a detail-in-context presentation system comprising the steps of:

a) selecting an input point $\vec{p}_{input}$ on said undistorted surface;

b) calculating a vector $\vec{v}$ from said input point $\vec{p}_{input}$ to a reference viewpoint $\vec{vrp}$;

c) locating a starting point $\vec{p}_{i-1}$, said starting point $\vec{p}_{i-1}$ lying above said distorted surface and on said vector $\vec{v}$;

d) locating a first bracketing $\vec{p}_i$ for a first intersection point of said vector $\vec{v}$ and said distorted surface, said first bracketing point $\vec{p}_i$ lying above said distorted surface and on said vector $\vec{v}$;

e) locating a second bracketing point $\vec{p}_{i+1}$ for said first intersection point, said second bracketing point $\vec{p}_{i+1}$ lying below said distorted surface, and below said first intersection point, but above any subsequent intersection points of said vector $\vec{v}$ and said distorted surface;

f) locating a midpoint $\vec{p}_{mid}$ between said first and second bracketing points $\vec{p}_i$, $\vec{p}_{i+1}$; and, g) determining if said midpoint $\vec{p}_{mid}$ is an acceptable approximation for said first intersection point, said acceptable approximation being an inversion point corresponding to said input point $\vec{p}_{input}$.

2. The method of claim 1 and further comprising the step of repeating steps (a) through (g) for remaining input points $\vec{p}_{input}$.

3. The method of claim 1 wherein said step of locating said starting point $\vec{p}_{i-1}$ comprises the step of:

adding to said input point $\vec{p}_{input}$ said vector $\vec{v}$ scaled by a predetermined step value step added to a ratio of said height h and a z-axis component of said vector $\vec{v}$, that is, $\vec{p}_{i-1} = \vec{p}_{input} + (h/v_7 + step)\vec{v}$.

4. The method of claim 1 wherein said step of locating said first bracketing point $\vec{p}_i$ comprises the step of:

subtracting from said starting point $\vec{p}_{i-1}$ said vector $\vec{v}$ scaled by predetermined step value step, that is, $\vec{p}_i = \vec{p}_{i-1} - step \cdot \vec{v}$.

5. The method of claim 1 wherein said step of locating said second bracketing point $\vec{p}_{i+1}$ comprises the steps of:

subtracting from said first bracketing point $\vec{p}_i$ said vector $\vec{v}$ scaled by a predetermined step value step, that is, $\vec{p}_{i+1} = \vec{p}_i - step \cdot \vec{v}$;

determining if said second bracketing point $\vec{p}_{i+1}$ lies below said distorted surface, and below said first intersection point, but above any subsequent intersection points of said vector $\vec{v}$ and said distorted surface by:

locating a first back-projection point $\vec{p}_{back}(i)$ by projecting said first bracketing point $\vec{p}_i$ parallel to a direction of displacement of said distorted surface $\vec{d}$ onto said undistorted surface;

locating a second back-projection point $\vec{p}_{back}(i+1)$ by projecting said second bracketing point $\vec{p}_{i+1}$ parallel to said direction of displacement $\vec{d}$ onto said undistorted surface;

determining a first field function value sign SIGN(F($\vec{p}_i$)) for said first bracketing point $\vec{p}_i$ by:

taking the sign of a first field function value F($\vec{p}_i$);
said first field function value F($\vec{p}_i$) determined by:
calculating a first three-dimensional distortion function point for said first back-projection point $D_3(\vec{p}_{back}(i))$ by applying said three-dimensional distortion function $D_3$ to said first back-projection point $\vec{p}_{back}(i)$ and subtracting from a z-axis component of said first three-dimensional distortion function point $D_3(\vec{p}_{back}(i))$ a z-axis component of said first bracketing point $\vec{p}_i$, that is, F($\vec{p}_i$)=$D_3(\vec{p}_{back}(i))_z - (\vec{p}_i)_z$;

determining a second field function value sign SIGN(F($\vec{p}_{i+1}$)) for said second bracketing point $\vec{p}_{i+1}$ by:
taking the sign of a second field function value F($\vec{p}_{i+1}$); said second field function value F($\vec{p}_{i+1}$) determined by:
calculating a second three-dimensional distortion function point for said second back-projection point $D_3(\vec{p}_{back}(i+1))$ by applying said three-dimensional distortion function $D_3$ to said second back-projection point $\vec{p}_{back}(i+1)$ and subtracting from a z-axis component of said second three-dimensional distortion function point $D_3(\vec{p}_{back}(i+1))$ a z-axis component of said second bracketing point $\vec{p}_{i+1}$, that is, F($\vec{p}_{i+1}$)=$D_3(\vec{p}_{back}(i+1))_z - (\vec{p}_{i+1})_z$;

comparing said first field function value sign SIGN(F($\vec{p}_i$)) to said second field function value sign SIGN (F($\vec{p}_{i+1}$)); said second bracketing point $\vec{p}_{i+1}$ lying below said distorted surface, and below said first intersection point, but above any subsequent intersection points of said vector $\vec{v}$ and said distorted surface if said first field function value sign SIGN(F($\vec{p}_i$)) is not equal to said second field function value sign, that is, SIGN(F($\vec{p}_{i+1}$))≠SIGN(F($\vec{p}_{i+1}$)); and, relocating said second bracketing point $\vec{p}_{i+1}$ if said second bracketing point $\vec{p}_{i+1}$ does not lie below said distorted surface, and below said first intersection point, but above any subsequent intersection points of said vector $\vec{v}$, that is, SIGN(F($\vec{p}_{i+1}$))=SIGN(F($\vec{p}_{i+1}$)), by:

determining a first field function slope value sign SIGN(F'($\vec{p}_i$)) for said first bracketing point $\vec{p}_i$;

determining a second field function slope value sign SIGN(F'($\vec{p}_{i+1}$)) for said second bracketing point $\vec{p}_{i+1}$;

comparing said first field function slope value sign SIGN(F'($\vec{p}_i$)) and said second field function slope value sign SIGN(F'($\vec{p}_{i+1}$)); and, if said first field function slope value sign SIGN(F'($\vec{p}_i$)) equals said second field function slope value sign SIGN(F'($\vec{p}_{i+1}$)), that is, SIGN(F'($\vec{p}_{i+1}$))=SIGN(F'($\vec{p}_{i+1}$)), then redefining said second bracketing point $\vec{p}_{i+1}$ as said first bracketing point $\vec{p}_i$ and repeating said step of locating said second bracketing point $\vec{p}_{i+1}$, or if said first field function slope value sign SIGN(F'($\vec{p}_i$)) does not equal said second field function slope value sign SIGN(F'($\vec{p}_i$)), that is, SIGN(F'($\vec{p}_{i+1}$))≠SIGN(F' ($\vec{p}_{i+1}$)), then reducing said predetermined step value step by a predetermined amount and repeating said step of locating said second bracketing point $\vec{p}_{i+1}$.

6. The method of claim 1 wherein said step of locating a midpoint $\vec{p}_{mid}$ between said first and second bracketing points $\vec{p}_i$, $\vec{p}_{i+1}$ comprises the step of:

adding said first and second bracketing points $\vec{p}_i$, $\vec{p}_{i+1}$ and dividing by two, that is, $$\vec{p}_{mid} = \frac{1}{2}(\vec{p}_i + \vec{p}_{i+1}).$$

7. The method of claim 1 wherein said step of determining if said midpoint $\vec{p}_{mid}$ is an acceptable approximation for said first intersection point comprises the steps of:

locating a midpoint back-projection point $\vec{p}_{midback}$ by projecting said midpoint $\vec{p}_{mid}$ parallel to said direction of displacement $\vec{d}$ onto said undistorted surface;

calculating a two-dimensional distortion function point for said midpoint back-projection point $D_2(\vec{p}_{midback})$ by applying a two-dimensional distortion function $D_2$ to said midpoint back-projection point $\vec{p}_{midback}$; said two-dimensional distortion function $D_2$ being said three-dimensional distortion function $D_3$ in said xy plane;

calculating a magnitude of the difference between said two-dimensional distortion function point $D_2(\vec{p}_{midback})$ and said input point $\vec{p}_{input}$, that is, $\|D_2(\vec{p}_{midback}) - \vec{p}_{input}\|$; and, comparing said magnitude of the difference $\|D_2(\vec{p}_{midback}) - \vec{p}_{input}\|$ to a predetermined tolerance $\epsilon$; said midpoint $\vec{p}_{mid}$ being said acceptable approximation for said first intersection point if said magnitude of the difference is less than said predetermined tolerance $\epsilon$, that is, $\|D_2(\vec{p}_{midback}) - \vec{p}_{input}\| < \epsilon$; and, if said magnitude of the difference $\|D_2(\vec{p}_{midback}) - \vec{p}_{input}\|$ is not less than said predetermined tolerance $\epsilon$, then redefining one of said first and second bracketing points $\vec{p}_i$, $\vec{p}_{i+1}$ as said midpoint $\vec{p}_{mid}$ and repeating said step of locating a midpoint $\vec{p}_{mid}$ and said step of determining if said midpoint $\vec{p}_{mid}$ is an acceptable approximation for said first intersection point, until said acceptable approximation is located for said first intersection point; said acceptable approximation being an inversion point corresponding to said input point $\vec{p}_{input}$.

8. The method of claim 1 wherein said presentation system establishing a notional three-dimensional perspective viewing frustrum with respect to an x, y, and z-axis coordinate system; said frustrum including a reference viewpoint $\vec{vrp}$ at an apex lying on said z-axis, a base in an xy-plane including said undistorted surface, and a reference view plane lying between said reference viewpoint $\vec{vrp}$ and said undistorted surface and upon which said distorted surface is projected; said presentation system including a display screen for viewing said reference view plane by a user; and, said distorted surface created by the application of a three-dimensional distortion function $D_3$ to said undistorted surface.

9. The method of claims 3, 4, or 5 and further comprising the step of selecting a value for said predetermined step value step.

10. The method of claim 5 and further comprising the step of selecting a value for said predetermined amount by which said predetermined step value step is reduced.

11. The method of claim 7 and further comprising the step of selecting a value for said predetermined tolerance ϵ.

12. The method of claim 11 wherein said predetermined tolerance ϵ is selected as a fraction of the width of a pixel for said computer display screen.

13. The method of claim 12 wherein said fraction is one half.

14. The method of claim 8 wherein said distortion function $D_3$ is an n-dimensional function, said n being an integer greater than two.

15. The method of claim 8 wherein said distortion function $D_3$ is a lens function.

16. The method of claim 8 wherein said detail-in-context presentation system is suitable for generating detail-in-context presentations in accordance with Elastic Presentation Space graphics technology.

17. The method of claim 8 wherein said base is said undistorted surface.

18. A system for inverting a distorted surface presentation into an undistorted surface presentation, said system having memory, a display, and an input device, said system comprising:

a processor coupled to said memory, display, and input device and adapted for:

a) selecting an input point $\vec{p}_{input}$ on said undistorted surface;

b) calculating a vector $\vec{v}$ from said input point $\vec{p}_{input}$ to a reference viewpoint $\vec{vrp}$;

c) locating a starting point $\vec{p}_{i-1}$ said starting point $\vec{p}_{i-1}$ lying above said distorted surface and on said vector $\vec{v}$;

d) locating a first bracketing point $\vec{p}_i$ for a first intersection point of said vector $\vec{v}$ and said distorted surface, said first bracketing point $\vec{p}_i$ lying above said distorted surface and on said vector $\vec{v}$;

e) locating a second bracketing point $\vec{p}_{i+1}$ for said first intersection point, said second bracketing point $\vec{p}_{i+1}$ lying below said distorted surface, and below said first intersection point, but above any subsequent intersection points of said vector $\vec{v}$ and said distorted surface;

f) locating a midpoint $\vec{p}_{mid}$ between said first and second bracketing points $\vec{p}_i$, $\vec{p}_{i+1}$; and, g) determining if said midpoint $\vec{p}_{mid}$ is an acceptable approximation for said first intersection point, said acceptable approximation being an inversion point corresponding to said input point $\vec{p}_{input}$.

19. A computer program product having a computer readable medium tangibly embodying computer executable code for directing a data processing system to invert a distorted surface presentation into an undistorted surface presentation, said computer program product comprising:

code for (a) selecting an input point $\vec{p}_{input}$ on said undistorted surface;

code for (b) calculating a vector $\vec{v}$ from said input point $\vec{p}_{input}$ to a reference viewpoint $\vec{vrp}$;

code for (c) locating a starting point $\vec{p}_{i-1}$, said starting point $\vec{p}_{i-1}$ lying above said distorted surface and on said vector $\vec{v}$;

code for (d) locating a first bracketing point $\vec{p}_i$ for a first intersection point of said vector $\vec{v}$ and said distorted surface, said first bracketing point $\vec{p}_i$ lying above said distorted surface and on said vector $\vec{v}$;

code for (e) locating a second bracketing point $\vec{p}_{i+1}$ for said first intersection point, said second bracketing point $\vec{p}_{i-1}$ lying below said distorted surface, and below said first intersection point, but above any subsequent intersection points of said vector $\vec{v}$ and said distorted surface;

code for (f) locating a midpoint $\vec{p}_{mid}$ between said first and second bracketing points $\vec{p}_i$, $\vec{p}_{i+1}$; and, code for (g) determining if said midpoint $\vec{p}_{mid}$ is an acceptable approximation for said first intersection point, said acceptable approximation being an inversion point corresponding to said input point $\vec{p}_{input}$.

20. A computer-implemented article having a computer readable modulated carrier signal being usable over a computer network, and having means embedded in the computer readable modulated carrier signal for directing a data processing system to invert a distorted surface presentation into an undistorted surface presentation, said article comprising:

means in the medium for (a) selecting an input point $\vec{p}_{input}$ on said undistorted surface;

means in the medium for (b) calculating a vector $\vec{v}$ from said input point $\vec{p}_{input}$ to a reference viewpoint $\vec{vrp}$;

means in the medium for (c) locating a starting point $\vec{p}_{i-1}$, said starting point $\vec{p}_{i-1}$ lying above said distorted surface and on said vector $\vec{v}$;

means in the medium for (d) locating a first bracketing point $\vec{p}_i$ for a first intersection point of said vector $\vec{v}$ and said distorted surface, said first bracketing point $\vec{p}_i$ lying above said distorted surface and on said vector $\vec{v}$;

means in the medium for (e) locating a second bracketing point $\vec{p}_{i+1}$ for said first intersection point, said second bracketing point $\vec{p}_{i+1}$ lying below said distorted surface, and below said first intersection point, but above any subsequent intersection points of said vector $\vec{v}$ and said distorted surface;

means in the medium for (f) locating a midpoint $\vec{p}_{mid}$ between said first and second bracketing points $\vec{p}_i$, $\vec{p}_{i+1}$; and, means in the medium for (g) determining if said midpoint $\vec{p}_{mid}$ is an acceptable approximation for said first intersection point, said acceptable approximation being an inversion point corresponding to said input point $\vec{p}_{input}$.

* * * * *

UNITED STATES PATENT AND TRADEMARK OFFICE
CERTIFICATE OF CORRECTION

PATENT NO. : 6,961,071 B2
APPLICATION NO. : 10/435657
DATED : November 1, 2005
INVENTOR(S) : Catherine Montagnese et al.

Page 1 of 1

It is certified that error appears in the above-identified patent and that said Letters Patent is hereby corrected as shown below:

Column 1, line 13: Replace the word "screen" with --screens--.

Column 3, line 5: Replace the word "That" with --that--.

Column 7, line 32: Replace the word "frame" with --from--.

Claim 3, column 14, line 48: Replace "$v_7$" with --$v_z$--.

Claim 4, column 14, line 54: Insert the word --a-- after the word "by".

Claim 5, column 15, line 57: Replace the first occurrence of " $\vec{p}_{i+1}$" with -- $\vec{p}_i$ --.

Claim 5, column 15, line 63: Replace " $\vec{p}_{i+1}$" with -- $\vec{p}_i$ --.

Claim 5, column 16, line 12: Replace the first occurrence of " $\vec{p}_{i+1}$" with -- $\vec{p}_i$ --.

Claim 5, column 16, line 21: Replace the first occurrence of " $\vec{p}_{i+1}$" with -- $\vec{p}_i$ --.

Claim 8, column 17, line 14: Replace the word "a" with --said--.

Claim 19, column 18, line 41: Replace " $\vec{p}_{i-1}$" with -- $\vec{p}_{i+1}$ --.

Signed and Sealed this

Twenty-sixth Day of June, 2007

JON W. DUDAS
*Director of the United States Patent and Trademark Office*